United States Patent [11] 3,629,624

[72] Inventor  Juergen H. Staudte
               P. O. Box 2866, Fullerton, Calif. 92633
[21] Appl. No. 21,598
[22] Filed     Mar. 23, 1970
[45] Patented  Dec. 21, 1971

[54] ELECTROSTATIC MOTOR
     19 Claims, 19 Drawing Figs.
[52] U.S. Cl. .................................................. 310/6,
                                                             318/116
[51] Int. Cl. ................................................ H02m 1/00
[50] Field of Search ....................................... 310/5, 6;
     318/116; 322/2; 324/70, 109, 166; 58/23, 23 A, 23
                                              AC, 26.5, 28 A

[56]              References Cited
              UNITED STATES PATENTS
      735,621   8/1903   Thomson ................... 324/109 X
    2,032,932   3/1936   Hauffe et al. ............... 310/6 UX
    2,835,105   5/1958   Favey ........................ 310/28
    3,013,201  12/1961   Goldie ....................... 322/2
    3,094,653   6/1963   Le May ...................... 322/2
    3,107,326  10/1963   Denholm ................... 322/2
    3,377,556   4/1968   Corcoran .................... 324/70
    3,384,816   5/1968   Romberg .................... 324/70
    3,436,630   4/1969   Bollee ........................ 318/116

*Primary Examiner*—D. X. Sliney
*Attorney*—Hinderstein & Silber

ABSTRACT: An electrostatic motor adapted for use in a wristwatch and comprising a pair of relatively rotatable, capacitor plate members each having a large number of spaced preferably sector-shaped segment which may be fabricated microlithographically. For synchronous operation, a unipolar square wave voltage is applied directly across the capacitor plate members, the resultant electrostatic forces causing rotation of the motor. In alternative embodiments, sets of capacitor plate segments may be driven by signals appropriately phased to insure unidirectional motor rotation, or the segments may be connected so that only one plate member receives a drive signal. For self-switching operation, the drive voltage is switched on or off in response to changes in effective capacitance as the motor rotates. The inventive device also may be used for extremely accurate measurement of rotational speed.

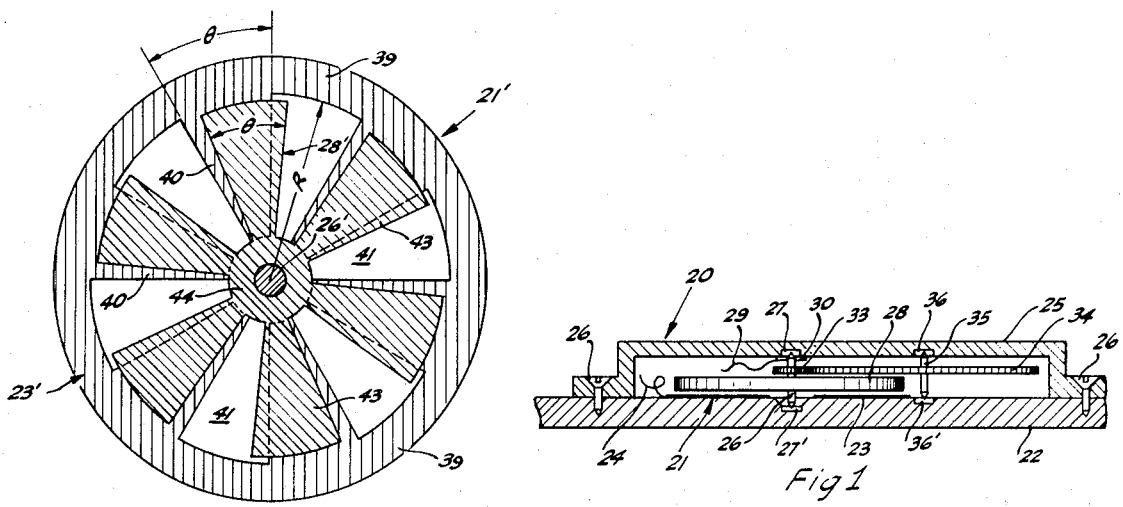

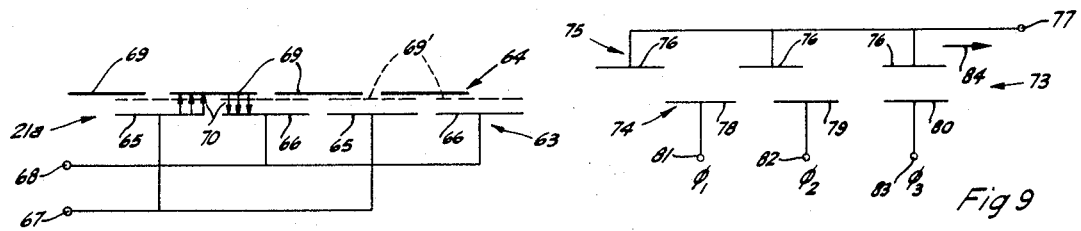
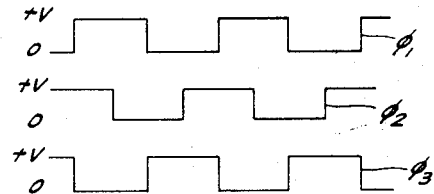
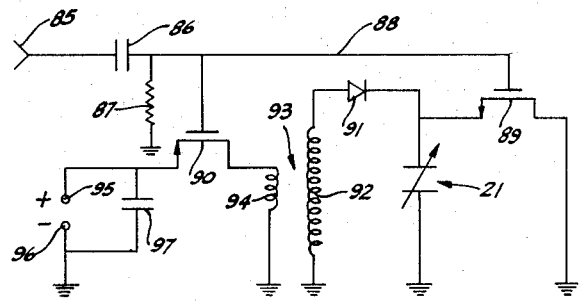
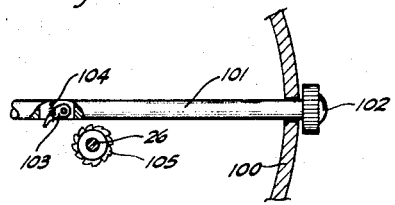
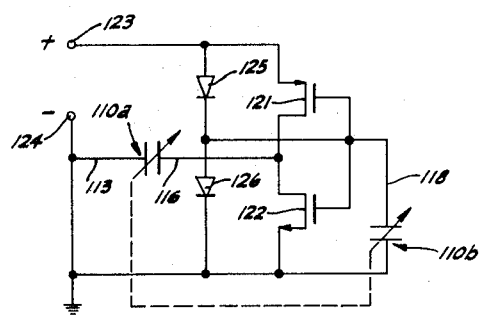
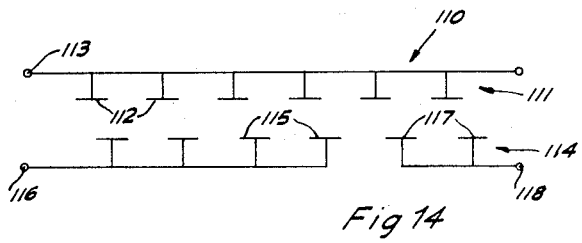
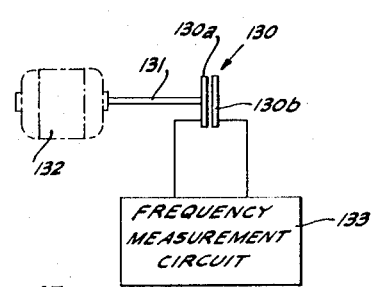
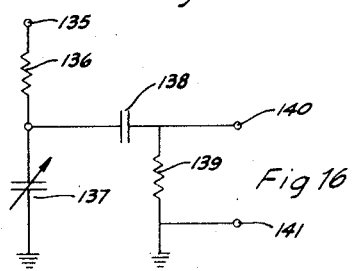

ELECTROSTATIC MOTOR

BACKGROUND OF THE INVENTION

1. Field of the Invention

The present invention relates to an electrostatic motor, and more particularly to an electrostatic motor which may be fabricated microlithographically and which is useful in a wristwatch or like application.

2. Description of the Prior Art.

In recent years, battery powered wristwatches have gained widespread acceptance. Such watches eliminate the need for winding, are reasonably accurate, and typically will operate for a year or more on a single battery. However, most commercially available electric wristwatches use flywheel and spring time standards, and thus do not offer the extreme accuracy possible with electronic time standards. Further, the available wristwatches are complex mechanically, and thus do not offer the advantage of simple maintenance.

In one type of available electronic wristwatch, a tuning fork is energized electromagnetically. The tuning fork functions as the time standard, and also provides the mechanical driving force for the watch. Such mechanical drive is facilitated by providing the tuning fork with a pawllike member which advances a drive wheel each time the tuning fork oscillates. The accuracy of such a watch depends on the characteristics of the tuning fork, and a complex mechanical scheme is required to convert vibration of the tuning fork into motion of the wristwatch hands.

In another commercially available wristwatch, an otherwise conventional watch escapement is driven electromagnetically. In such a watch, the battery and electromagnetic drive means merely replace the conventional spring winding mechanism, but the accuracy of the watch still depends on the characteristics of the flywheel and hair spring.

While attempts have been made in the past to utilize true electronic frequency standards in wristwatches, implementation has been difficult since most electronic oscillators operate at a relatively high frequency, whereas available motors require a relatively low-frequency input. It is possible to utilize frequency division circuitry receiving the oscillator signal and providing an output of low enough frequency to drive a motor. However, in the past such divider circuitry has required high voltage and relatively high power for operation. Clearly, such circuitry could not be operated with a 1.5 or 3 volt cell, and would not continue to operate with the same cell for an extended time period of 6 months or more. While low-voltage hybrid integrated circuit dividers are available, the cost of such circuits is prohibitive for most wristwatch applications.

Small synchronous AC motors have been available in the past, but these also have serious inherent shortcomings which make such motors unacceptable for incorporation in a timepiece. For example, if such a motor is to rotate at relatively slow speed, the input AC drive signal itself must be of low frequency. The difficulties of obtaining such a drive signal have been mentioned above. Should such a motor be fed with a high-frequency drive signal, the motor speed will be concomitantly high thus requiring complicated gearing to drive the wristwatch hands. Moreover, almost all prior art motors utilize wire-wound stator or rotor members which are difficult and costly to fabricate in a motor sufficiently small to fit in a wristwatch. Further, the power consumption of such motors is prohibitive for wristwatch use.

These and other shortcomings of the prior art are overcome using the inventive electrostatic motor. Preferred embodiments of the motor may be fabricated microlithographically with dimensions commensurate with small ladies wristwatches. The motor is capable of synchronous operation, and rotates at a relatively slow speed while being driven by a relatively high-frequency signal. The electrostatic motor thus readily can take advantage of electronic time standards, and provides a mechanical output capable of driving the hands of a wristwatch with a very simple mechanical gear arrangement. The inventive device may be utilized not only as a motor but also as a transducer for extremely precise measurement of speed.

SUMMARY OF THE INVENTION

In accordance with the present invention, there is provided an electrostatic motor comprising a pair of relatively rotatable, planar, multisegmented capacitor plate members driven by a periodic, unipolar voltage applied directly across the capacitor plate members. Although not so limited, the electrostatic motor is well adapted for use in a wristwatch.

In a preferred embodiment, each capacitor plate member comprises a large number of spaced, electrically connected, sector-shaped segments which may be fabricated multilithographically. For synchronous operation, a unipolar periodic voltage is applied directly across the capacitor plate members. For such embodiment, the speed of rotation typically is equal to the driving frequency divided by the number of spaced segments on either capacitor plate member. Thus, for example, an embodiment having 1,000 segments, and driven by a 1 kHz. signal will rotate at 1 revolution per second.

In an alternative embodiment, the segments on one capacitor plate member may be electrically connected in two sets, with the driving voltage applied therebetween. In such embodiment, the segments on the other capacitor plate members may be electrically disconnected, and thereby serve as passive elements of the device. Such embodiment eliminates the need for providing a voltage directly to the rotational member of the motor.

In another embodiment, the segments on one or both of the capacitor plate members may be electrically connected in sets, and driven by phased signals. Such an embodiment insures unidirectional motor operation.

A self-switching version of the inventive electrostatic motor also is disclosed. In this embodiment, certain of the capacitor plate segments are used to control a switching circuit which thereby produces a motor drive signal responsive to the instantaneous relative position of the capacitor plate members. No external periodic signal is required to drive such embodiment.

The inventive capacitive structure also may be used in conjunction with a high impedance voltage source provided thereacross, either for power generation or for the extremely accurate measurement of rotational speed.

Thus it is an object of the present invention to provide a novel electrostatic motor.

Another object of the present invention is to provide an electrostatic motor adapted for use in a wristwatch.

It is another object of the invention to provide a synchronous electrostatic motor driven by a periodic signal of relatively high frequency and having a relatively low rotational speed.

Yet another object of the present invention is to provide an electrostatic motor comprising a pair of relatively movable, multisegmented capacitor plate members and driven by a periodic voltage applied directly across such members.

It is still another object of the present invention to provide an electrostatic motor capable of being fabricated microlithographically and typically having a maximum dimension of less than 3 centimeters.

Yet another object of the present invention is to provide an electrostatic motor having a relatively stationary, multisegmented plate member cooperating with either an active or a passive multisegmented rotary capacitor plate member.

It is a further object of the present invention to provide an electrostatic motor incorporating multisegmented capacitor plate members wherein sets of such segments are driven by phased signals.

It is a further object of the present invention to provide an electrostatic motor which is self-switched in response to changes changes in capacitance of the motor itself.

Yet a further object of the present invention is to provide a novel transducer for the accurate measurement of rotational or linear speed.

BRIEF DESCRIPTION OF THE DRAWINGS

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

FIG. 1 is a side elevation view, partly in section, of an electrostatic motor in accordance with the present invention and incorporated in an apparatus such as a wristwatch.

FIG. 2 is a simplified top plan view of the rotary and stationary capacitor plate members of the electrostatic motor of FIG. 1;

FIG. 3 is an electrical schematic diagram of the electrostatic motor of FIG. 1;

FIG. 4A, 4B and 4C are waveforms useful in describing operation of the electrostatic motor of FIG. 1;

FIG. 5 is a top plan view of one embodiment of the stationary capacitor plate member of an electrostatic motor;

FIG. 6 is a bottom plan view of a rotary capacitor plate member useful in an electrostatic motor;

FIGS. 7A and 7B are side views of alternative embodiments of a rotary capacitor plate member, as seen generally along the line 7—7 of FIG. 6;

FIG. 8 is an electrical schematic diagram of another embodiment of an electrostatic motor, herein utilizing passive segments on one capacitor plate member;

FIG. 9 is an electrical schematic diagram of another electrostatic motor embodiment adapted for unidirectional rotation;

FIG. 10 shows waveforms of phased signals which may be used to drive the electrostatic motor of FIG. 9;

FIG. 11 is an electrical schematic diagram of a circuit which may be used to provide a synchronous drive signal to an electrostatic motor;

FIG. 12 is a fragmentary, top plan view partly in section, of a mechanism for starting an electrostatic motor such as that shown in FIG. 1;

FIG. 13 is an electrical schematic diagram of a capacitor-switched circuit for providing a drive signal to an electrostatic motor;

FIG. 14 is an electrical schematic diagram of an electrostatic motor configured for operation in conjunction with the circuit of FIG. 13;

FIG. 15 illustrates the manner in which the electrostatic motor structure of FIGS. 1 and 2 may be utilized to measure rotational speed; and FIG. 16 is an electrical schematic diagram illustrating how the electrostatic motor structure of FIGS. 1 and 2 may be used as a generator.

DESCRIPTION OF THE PREFERRED EMBODIMENTS

Referring now to the drawings, and particularly to FIG. 1 thereof, there is shown an apparatus 20, for example, a wristwatch, incorporating an electrostatic motor 21 in accordance with the present invention.

Apparatus 20 includes a base 22, preferably of a dielectric material, on the upper surface of which is disposed a stationary capacitor plate member 23. As will be described in detail hereinbelow, plate member 23 may comprise a film or deposited layer of electrically conductive material, and may have a multisegmented configuration defined microlithographically. A first wire 24 provides electrical connection to plate member 23 of motor 21.

A bracket 25 (FIG. 1) is attached to the upper surface of base 22 by means of screws 26. Extending between base 22 and bracket 25 is a shaft 26 the ends of which are mounted in appropriate bearings 27 and 27'. A disc-shaped rotary member 28 is attached coaxially to shaft 26 for rotation therewith As will be described in detail below, the bottom surface of member 28 is provided with a pattern of electrically conductive capacitor segments, so that member 28 functions as the rotary capacitor plate member for electrostatic motor 21. By utilizing an electrically conductive shaft 26, electrical connection to capacitor plate member 28 may be facilitated by means of a wire 29 and a slip ring 30 cooperating with shaft 26. Alternatively, other techniques such as brush contact, electric contact through gears, or capacitive coupling may be used to provide a voltage to rotary capacitor plate member 28.

To utilize the torque produced by electrostatic motor 21. Shaft 26 also is provided with a relatively small gear 33. Gear 33 meshes with a relatively larger gear 34 attached to a shaft 35 extending between a pair of bearings 36, 36' mounted respectively in bracket 25 and base 22. In a typical embodiment, rotary capacitor plate member 28 may have a diameter of less than about 3 centimeters, and may rotate at a speed of 1 revolution per second, but of course the invention is not so limited. By utilizing a gear ratio between gears 33 and 34 of 1:60, shaft 35 then may rotate at 1 revolution per minute. In such instance, shaft 35 could be used directly to drive the second hand of a wristwatch. Conventional gearing (not shown) then could be utilized to drive the minute and hour hands of the clock.

An exemplary capacitor plate configuration for an electrostatic motor 21' is illustrated in FIG. 2. Referring thereto, motor 21' includes a relatively stationary, multisegmented capacitor plate member 23', and a multisegmented rotary capacitor plate member 28'. Stator 23' includes a peripheral annular region 39 extending radially inwardly from which are a plurality of generally sector-shaped electrically conductive segments 40. In the embodiment of FIG. 2, segments 40 are of equal angular width $\theta$ and are separated by spaces 41 of equal angular width. Segments 40 stop short of the center of member 23', and hence do not make electrical contact with the shaft 26' supporting rotary member 28'.

For clarity of presentation, only the electrically conductive segments of rotary capacitor plate member 28' are shown in FIG. 2. In particular, member 28' includes a plurality of electrically conductive segments 43 equal in number and angular width $\theta$ to segments 40 of capacitor plate member 23'. Segments 43 each extend radially outwardly from a central, generally circular conductive region 44, the center of which is rigidly attached to shaft 26'. Shaft 26', circular region 44 and segments 43 all are electrically connected. The outer radius R of segments 43 is approximately the same as the inner radius of annular portion 39 of capacitor plate member 23'.

Electrostatic motor 21' (FIG. 2) may be represented by the electrical schematic diagram of FIG. 3. As seen therein, each of the segments 40 of capacitor plate member 23' are electrically connected via a line 46 to a first terminal of a source 47 of unipolar periodic voltage. The other terminal of source 47 is connected via a line 48 to the segments 43 of rotary capacitor plate member 28'. The arrow 49 indicates that capacitor plate member 28' is relatively movable with respect to member 23', as from the maximum capacitance (full overlap) position shown in solid lines to the minimum capacitance (no overlap) position shown in phantom at 43' in FIG. 3.

To drive electrostatic motor 21' in a synchronous mode, a periodic, unipolar voltage is supplied from source 47 across capacitor plate members 23' and 28'. Typically, this voltage may have the waveform 50 shown in FIG. 4A, and thus comprise a square wave which alternates between 0 potential and $+V$ volts. Alternatively, a voltage which alternates between 0 and $-V$ volts may be utilized. Moreover, the drive signal from source 47 need not be a square wave, and a sinusoidal or periodic signal of other wave shape may be employed. A nonsquare wave, alternating polarity periodic signal also may be used.

If the voltage supplied by source 47 is turned on when the plates of electrostatic motor 21' are not fully overlapped, the resultant electrostatic field between capacitor plate members 23' and 28' will produce a force tending to move the capacitor plates toward the full overlap configuration. (Note that motion of capacitor plate member 28' toward or away from member 23' is prevented by the mechanical arrangement of electrostatic motor 21'.) If the voltage is turned off as soon as the capacitor plates are completely overlapped, inertia will cause capacitor plate member 28' to continue to rotate in the direction indicated by arrow 49. Maximum torque for motor 21' may be achieved by keeping the voltage off until the capacitor plates reach the minimum capacitance (no overlap) condition, and then keeping the voltage on until the capacitor plates again reach the maximum capacitance (full overlap) configuration. This situation is illustrated by the broken curve 51 of FIG. 4B.

The torque produced in this situation is illustrated by broken curve 52 in FIG. 4C. Note that a positive torque is produced for the entire time that the voltage (waveform 50) from source 47 is on, as plate member 28' moves toward the full overlap position. No torque is produced during the time that the voltage is off, as plate member 28' goes toward the minimum capacitance (no overlap) condition.

This maximum torque condition actually will cause capacitor plate member 28' to rotate at an increasing rate, since more energy is being added to the system than is necessary to overcome friction. Of course, to continue operation in the maximum torque condition, the frequency of the periodic voltage provided by source 47 must increase concomitantly. Thus, curves 50, 51 and 52 do not accurately represent the maximum torque condition; in actuality, the frequency of voltage waveform 50, and the rate of rotation of capacitor plate member 28' both would increase with time. The maximum torque condition generally is not utilized for application such as driving a clock, wherein rotation in synchronism with a constant frequency drive signal is desired.

The minimum torque condition for electrostatic motor 21' is illustrated by the dashed capacitance curve 53 of FIG. 4B, and by the dashed torque curve 54 of FIG. 4C. In this situation, the voltage (waveform 50) is turned on when capacitor plate member 28' overlaps exactly half of stationary capacitor plate member 23'. The voltage is kept on as member 28' moves through the minimum capacitance (no overlap) condition and again starts to overlap member 23'. The voltage is turned off when the capacitor plate members are half overlapped again, and are moving toward the full overlap condition.

As is evident from waveform 54, a negative torque, tending to slow down rotation of capacitor plate member 28', is produced for half of the time that the voltage (waveform 50) is on. During the other half of the voltage on time, as the capacitor plate members are moving toward the maximum capacitance condition, a positive torque is produced, tending to speed up rotation of capacitor plate member 28'. Since the negative torque is exactly equal to the positive torque, the average torque is 0 and no rotation of electrostatic motor 21' will be obtained.

Stable operation of electrostatic motor 21', in synchronism with a periodic voltage (waveform 50) of constant frequency, is represented by the solid curve 55 of FIG. 4B, and by the associated torque curve 56 of FIG. 4C. To initiate such stable operation, capacitor plate member 28' initially is rotated at a speed greater than that associated with synchronous operation. As a result, frictional forces will tend to slow down rotation of member 28'. Rapidly the condition will be reached, illustrated by waveforms 55 and 56, wherein during slightly less than half of the voltage on time, a negative torque will be produced as indicated by waveform portion 56a. During slightly more than half of the voltage on time, a positive torque (represented by waveform portion 56b) will be produced. The resultant net positive torque will be sufficient to overcome friction and to drive the load associated with motor 21', and yet maintain rotation of capacitor plate member 28' in synchronism with the driving signal (waveform 50) supplied from source 47. It is this stable mode of operation which is used to drive the wristwatch or like apparatus 20 of FIG. 1.

An exemplary embodiment of capacitor plate member 23 (FIG. 1) is illustrated in FIG. 5. Referring thereto, stationary capacitor plate member 23a comprises a film or layer of metal deposited atop an electrically insulating substrate 22a. Plate member 23a includes an annular peripheral region 39a extending inwardly from which are a large plurality of generally sector-shaped capacitor plate segments 40a, separated by spaces 41a. An electrically conductive pad 57 projects radially outwardly from portion 39a, and provides an area for attachment, as by fusion or ultrasonic bonding, of a wire 24a.

In a typical configuration for a ladies wristwatch, the inner diameter of annular region 39a may be on the order of 1 centimeter. The maximum spacing between adjacent segments 40a may be in the range of from about 0.5 mil to about 1 mil, thereby permitting utilization of considerably more than 500 segments 40a.

Capacitor plate member 23a may be produced microlithographically using conventional microelectronic fabrication techniques. For example, a thin metal film of gold, aluminum, platinum or the like initially may be vapor deposited atop substrate 22a. Next, a conventional photoresist material is coated atop the deposited metal layer. This photoresist is exposed photographically through a mask or negative image of the desired capacitor plate configuration. The photoresist then is developed, leaving a polymerized coating over those areas of the deposited metal film which were exposed to light, and leaving uncovered the areas which were not expose. The metal film and photoresist pattern then are subjected to an acid etching bath, which etches away the exposed areas of metal, but which does not etch away those areas of metal covered by the polymerized photo resist. The acid completely removes the unprotected metal film areas, all the way down to substrate 22a. Finally, the residual polymerized photoresist is removed with an appropriate solvent, thereby producing in the desired capacitor plate member 23a configuration.

FIGS. 6, 7A and 7B show alternative embodiments of rotary capacitor plate member 28 (FIG. 1). Referring first to FIG. 6, capacitor plate member 28a includes a large plurality of spaced, generally sector-shaped capacitor plate segments 43a, extending radially outwardly from an electrically conductive central region 44a. The quantity and dimensions of segments 43a may be the same as the quantity and dimensions of segments 40a of stationary capacitor plate member 23a (FIG. 5).

Capacitor plate segments 43a may be formed by selective etching of a metal disc 58 as shown in FIG. 7A, or may comprise a film or layer of metal disposed on the surface of an electrically insulative disc 59 as shown in FIG. 7B. In the embodiment of FIG. 7A, metal disc 58 typically may have a thickness on the order of 10 mils and be etched back selectively in the regions 60 as through an exposed photoresist mask, so that the unetched regions 43a' have the appearance of, and correspond to, capacitor plate segments 43a. Preferably, the depth of etched regions 60 is somewhat greater than the separation distance between capacitor plate members 23 and 28 in electrostatic motor 21 (FIG. 1). For example, if this separation distance is on the order of 0.5 mil, the etch depth of regions 60 may be from 2 to 3 mils. This etch depth is sufficient to insure that the effective capacitance of regions 60 is insignificant as compared with the capacitance provided by unetched segments 43a'.

In the embodiment of FIG. 7B, capacitor plate segments 43a'' are formed microlithographically on the surface of electrically insulative substrate 50. The manner of fabrication is analogous to that described hereinabove in conjunction with FIG. 5. The resultant thin metal film segments 43a'' may correspond to segments 43a of FIG. 6.

The total torque $\tau$ available from electrostatic motor 21 (FIG. 1) is given by the following equation:

$$\tau \approx (\kappa N V^2 R^3)/(6)$$

wherein $\kappa$ is the dielectric constant (and equal to 1 for air), $N$ is the number of segments 40a or 43a, $V$ is the voltage supplied by source 47, $R$ is the maximum radius of segments 40a or 43a, and $a$ is the spacing between capacitor plate members 23 and 28.

By way of illustration only, an electrostatic motor for a ladies wristwatch may have the following parameters:

$\kappa = 1$ $V = 1.5$ volts $a = 10^{-3}$ centimeters
$N = 1,000$
$R = 0.5$ centimeters Utilizing the equation given above, it may be seen that a motor having the illustrative dimensions will produce a torque of about 0.5 dyne centimeters. This torque is sufficient to drive the hands of a wristwatch. The power required to drive the motor is approximately 0.3 microwatts. If the radius $R$ were increased to 1 centimeter, a torque of 4 dyne centimeters would be achieved, and the power requirement would be 2.4 microwatts. With a voltage $V=3$ volts and a radius $R=1$ centimeter, a torque $\tau=16$ dyne centimeters would be produced, using about 10 microwatts of power.

In certain applications, it may be impractical or undesirable to supply a drive voltage to rotary capacitor plate member 28. The passive plate electrostatic motor configuration shown schematically in FIG. 8 is particularly useful for such application.

Referring to FIG. 8 electrostatic motor 21a is seen to comprise a stationary capacitor plate member generally designated 63 and a rotary capacitor plate member generally designated 64. Member 63 may include a large quantity of generally sector-shaped segments 65, 66 alternate ones of which are electrically connected to form two sets of active segments. For example, segments 65 are electrically connected to a first terminal 67. The segments 66 situated between segments 65 are electrically connected to a second terminal 68. Rotary member 64 (FIG. 8) includes a quantity of generally sector-shaped capacitor plate segments 69 which are not electrically connected to each other.

The maximum capacitance configuration of electrostatic motor 21a is shown in solid lines in FIG. 8, with each capacitor segments 69 equally overlapping a portion of one segment 65 and an adjacent segment 66. In this configuration, if a voltage is applied between terminals 67 and 68, an electric field is produced between segments 65, 69 and 66. For example, if terminal 68 is negative with respect to terminal 67, the resultant electric field is indicated by arrows 70 in FIG. 8. The minimum capacitance configuration is indicated by the phantom lines 69' FIG. 8 and occurs when segments 69 are directly opposite segments 65, 66.

Operation of electrostatic motor 21a (FIG. 8) is analogous to that described hereinabove in connection with FIGS. 2, 3 and 4, with due regard to the minimum and maximum capacitance conditions illustrated in FIG. 8.

The motor embodiments described hereinabove will operate with capacitor plate member 28 (FIG. 1) rotating either clockwise or counterclockwise. By electrically connecting the segments on one capacitor plate member into two or more sets, and driving the sets out of phase, unidirectional motor operation can be achieved. Such a configuration is indicated schematically in FIG. 9.

Referring to FIG. 9, electrostatic motor 73 comprises a relatively stationary capacitor plate member 74 and a rotary capacitor plate member 75. Member 75 includes a plurality of capacitor segments 76 of equal angular width, separated from each other by spaces of the same angular width, and all electrically connected to a common terminal 77. Capacitor plate member 74 includes plurality of segments 78, 79, 80 each preferably having angular width equal to segments 76. However, the spacing between adjacent segments 78, 79, 80 is equal to half the angular width of a typical segment 76. Thus, when one of segments 80 is opposite a segment 76, as shown in FIG. 9, an adjacent segment 79 will overlap half of another segment 76, while the next adjacent segment 78 will be opposite a space between two segments 76.

Segments 78 (FIG. 9) are connected to a first terminal 81, segments 79 are connected to a second terminal 82, and segments 80 are connected to a third terminal 83. To drive electrostatic motor 73, three separate unipolar periodic signals $\Phi_1$, $\Phi_2$ and $\Phi_3$ are supplied respectively between common terminal 77 and terminals 81, 82 and 83. The three signals $\Phi_1$, $\Phi_2$ and $\Phi_3$ are appropriately phased with respect to the relative spacing of segments 78, 79, 80 so as to achieve the additive torque and unidirectional motor rotation. For example, the three signals $\Phi_1$, $\Phi_2$, $\Phi_3$ may correspond to the like designated square waves shown in FIG. 10. Such signals will cause rotation of electrostatic motor 73 in the direction indicated by arrow 84 in FIG. 9.

Referring now to FIG. 11 here is shown an electrical circuit which may be used (as source 47) to drive motor 21 in synchronism with a low-level, high-impedance square wave sync signal supplied to an input terminal 85. The input signal is differentiated by a capacitor 86 and a resistor 87 and supplied via a line 88 to the control electrodes of a complimentary pair of field-effect transistors 89 and 90. The source and drain of transistor 89 are connected across the capacitor plate members of motor 21, which motor is represented schematically as a variable capacitor in FIG. 11. One capacitor pate member of motor 21 also is connected via a diode 91 to the output winding 92 of a step-up transformer 93. The input winding 94 of transformer 93 is connected via the source and drain of transistor 90 to the positive terminal 95 of a low impedance voltage source such as a battery (not shown). The negative terminal 96 of the voltage source is connected to ground. A capacitor 97 is connected across terminals 95, 96 and is charged by the voltage source.

Operation of the circuitry of FIG. 11 is straightforward. Each positive going transition of the input square wave sync signal is differentiated by capacitor 86 and resistor 87 to provide a positive going transient on line 88. This transient turns off transistor 89 and turns on transistor 90. Capacitor 97, which has been charged to the voltage level of source 95, 96 then discharges through transistor 90 and the primary 94 of transformer 93. As a result, a considerably larger voltage is induced in output winding 92, which voltage is supplied via diode 91 to electrostatic motor 21.

Each negative going transition of the input square wave supplied via terminal 85 results in a negative pulse at the output of capacitor 86, which pulse turns on transistor 89 and leaves off transistor 90. As a result, during this portion of the operating cycle, electrostatic motor 21 is shorted. Thus it will be apparent that electrostatic motor 21 receives a periodic, unipolar voltage of sufficient magnitude to drive motor 21, the drive voltage being synchronous with the control signal supplied at terminal 85.

As discussed hereinabove, electrostatic motor 21 (FIGS. 1 and 2) is not self-starting. To start motor 21, it is desirable to impart rotation of capacitor plate member 28 in the desired direction (i.e., clockwise or counterclockwise) and at a speed greater than that commensurate with synchronous operation. FIG. 12 illustrates a mechanical arrangement for imparting such starting rotation to motor member 28.

Referring to FIG. 12, there is shown a fragmentary portion 100 of a housing, such as a wristwatch case, containing motor 21. A wristwatch stem 101 and crown 102 project through case 100 and have an external appearance not unlike a conventional wristwatch. Of course stem 101 and crown 102 are not required for the purpose of winding the watch, since the watch is powered by electrostatic motor 21. Stem 101 is provided with pawl 103 which is biased to the extended position shown by means of a spring 104. Shaft 26, to which rotary capacitor plate member 28 is attached, is provided with a ratchet 105 situated adjacent stem 101.

To start motor 21, stem 101 and crown 102 are pulled outward of case 100 (i.e., to the right in FIG. 12) sufficiently far so that pawl 103 goes past ratchet 105. During this motion, pawl 103 is displaced by ratchet 105 inward of stem 101. Stem 101 and crown 102 then are pushed back to the position shown in FIG. 12. During this reinsertion operation, pawl 103 catches one of the teeth of ratchet 105, causing counterclockwise rotation (as viewed in FIG. 12) of shaft 26 and rotary capacitor plate member 28. The motion thus imparted is sufficient to start operation of motor 21. Motor 21 thereafter will continue rotating in the same direction, in synchronism with the signal from source 47.

FIGS. 13 and 14 illustrate a self-switching version of the inventive electrostatic motor. In this embodiment, electrostatic motor 110 (FIG. 14) includes a multisegmented rotary capacitor plate member 111 having a plurality of segments 112 each connected to a common terminal 113. Member 111 may have an appearance similar to rotary capacitor plate member 28a shown in FIG. 6 above. Motor 110 also includes a stationary capacitor plate member 114 analogous in appearance to member 23a of FIG. 5.

The majority of capacitor plate segments 115 on member 114 are electrically connected to a terminal 116, and are used as the driving portion of motor 110. The remaining segments 117 of capacitor plate member 114 are connected to another terminal of 118 and are used as a switching capacitor in the circuit of FIG. 13. The driving portion of electrostatic motor 110 is represented schematically in FIG. 13 by the variable capacitor symbol designated 110a, while the switching portion of motor 110 is represented by the variable capacitor symbol designated 110b in FIG. 13.

Referring to FIG. 13, the switching circuitry s shown therein includes a complimentary pair of field-effect transistors 121 and 122, the control electrodes of which are connected to the switching capacitor terminal 118 of electrostatic motor 110. The sources and drains of transistors 121 and 122 are series connected across a source of voltage supplied via terminals 123 and 124. A pair of diodes 125 and 126 also are series connected across terminals 123 and 124, the junction of diodes 125 and 126 being connected to terminal 118. Motor common terminal 113 is connected to the voltage source terminal 124, and motor drive terminal 116 is connected to the junction between transistors 121 and 122.

In operation, the resistances through forward-biased diodes 125 and 126 act as a high-impedance voltage divider for the voltage supplied across terminals 123 and 124 which is below that required to initiate conduction of diodes 125 and 126. The resultant voltage obtained at the junction between diodes 125 and 126 is supplied via terminal 118 to motor switching capacitor portion 110b.

As motor 110 rotates, the capacitance of switching portion 110b varies in triangular fashion, with a concomitant variation in voltage level at terminal 118. This periodically changing voltage at terminal 118 alternately turns transistors 121 and 122 on and off. Thus, during the portion of time that transistor 121 is on, transistor 122 is off, and the voltage supplied via terminals 123 and 124 is connnected directly across the driving portion 110a of electrostatic motor 110. In the portion of time that transistor 122 is on, transistor 121 is off, no voltage is applied across motor portion 110a, and in effect motor portion 110a is shorted out by transistor 122.

It will thus be appreciated that the circuitry of FIG. 13 switches the voltage on and off to motor portion 110a in response to the relative position of the capacitor plate members 111, 114 of motor 110 as indicated by switching capacitor portion 110b thereof. For this motor, only a DC source of voltage between terminals 123 and 124 is required. However, synchronous operation also may be achieved with the circuitry of FIG. 13 by providing a periodic voltage across terminals 123 and 124.

As was noted in conjunction with switching capacitor portion 110b of electrostatic motor 110, by applying a high-impedance voltage source across the device, the capacitance which is continuously varying as a function of device rotation may be used to perform an external function (such as switching in conjunction with the circuitry of FIG. 13). This varying capacitance also may be used as shown in FIG. 15 to perform rotational speed measurement, and as shown in FIG. 16 to achieve power generation.

With reference to FIG. 15, there is shown a capacitor-type device 130 having the physical configuration described hereinabove in connection with FIGS. 1, 2, 5 and 6. However, device 130 is not supplied with a drive signal (as per FIG. 3) but rather is driven mechanically by means of a shaft 131, rotational motion of which is imparted by a motor 132 or other apparatus. As device 130 is rotated by shaft 131, the capacitance appearing across capacitor plate members 130a and 130b will vary as a function of the rate of rotation of shaft 131. An appropriate frequency measurement circuit 133 may be used to measure the frequency at which the effective capacitance of device 130 is changing. This frequency is directly indicative of the rate of rotation of shaft 131. Frequency measurement circuitry 133 may include a high-impedance voltage source applied across members 130a and 130b, together with a conventional frequency meter receiving as an input the periodically changing voltage resultant as device 130 is rotated.

The apparatus of FIG. 15 is extremely precise, particularly when using a large number of capacitor plate segments on each of members 130a and 130b. For example, with 1,000 segments on each of members 130a and 130b, and with shaft 131 rotating at 1 revolution per second, an increase in rotational speed of 1 percent will cause a change in output frequency from 1.000 kHz. to 1.010 kHz.

To utilize the inventive capacitor structure as a voltage generator, the circuitry of FIG. 16 may be employed. Referring to FIG. 16, a voltage is connected via a terminal 135 and a very high resistance 136 across a device 137 physically corresponding to that described above in conjunction with FIGS. 1, 2, 5 and 6 and represented in FIG. 16 by variable capacitor symbol. Device 137 is driven by a motor (not shown) and so exhibits periodically changing capacitance. As a result, a changing voltage is developed across device 137 which may be fed via a capacitor 138 to a load such as resistor 139. In effect, a low-impedance voltage is generated across output terminals 140 and 141. The power there available of course is supplied to the system by the motor used to rotate device 137.

While the invention has been described with respect to the preferred physical embodiments constructed in accordance therewith, it will be apparent to those skilled in the art that various modifications and improvements may be made without departing from the scope and spirit of the invention.

I claim:

1. An electrostatic motor comprising:
    first and second generally circular, relatively rotatable, planar, multisegmented capacitor plate members each of less than about 3 centimeters diameter and disposed in coaxial, close-spaced parallel relationship, said first plate having a large number N of generally sector-shaped, spaced electrically connected segments, said generally plate member having a like number N of generally sector-shaped electrically connected segments,
    drive means for periodically impressing an electric field across said plate members, said drive means comprising means for supplying to said plate members a periodic signal of frequency $f$ cycles per second said motor thereby rotating at a speed $f/N$ revolutions per second, and
    wherein said periodic signal comprises a unipolar, square wave voltage.

2. An electrostatic motor as defined in claim 1 wherein said segments are produced microlithographically.

3. An electrostatic motor as defined in claim 1 wherein one of said plate members is stationary and the other is rotary.

4. An electrostatic motor as defined in claim 3 wherein said rotary member comprises a disc of electrically insulative material and wherein said segments comprise a conductive film or layer disposed on one surface of said disc.

5. An electrostatic motor as defined in claim 3 wherein said rotary member comprises an electrically conductive disc, portions of said disc being etched away to define said segments.

6. An electrostatic motor as defined in claim 5 wherein the thickness of said disc is on the order of 10 mils, wherein the spacing between said plate members is on the order of 0.5 mils, and wherein said disc is etched to a depth of at least 2 mils to define said elements.

7. An electrostatic motor as defined in claim 3 wherein said stationary member comprises an electrically insulative substrate and wherein said segments comprise a conductive film or layer disposed on the surface of said substrate facing said disc.

8. An electrostatic motor comprising:

first and second generally circular, relatively rotatable, planar, multisegmented capacitor plate members each of less than about 3 centimeters diameter and disposed in coaxial, close-spaced parallel relationship, said first plate having a large number N of generally sector-shaped, spaced electrically connected segments, said second plate member having a like number N of generally sector-shaped electrically connected segments, drive means for periodically impressing an electric field across said plate members, said drive means comprising means for supplying to said plate members a periodic signal of frequency $f$ cycles per second, said motor thereby rotating at a speed $f/N$ revolutions per second, and wherein the segments of one plate member are connected in two sets, and wherein the elements on the other of said plate members are not electrically connected, said drive means comprising means for providing a unipolar, periodic voltage across said two sets.

9. An electrostatic motor comprising:

first and second generally circular, relatively rotatable, planar, multisegmented capacitor plate members each of less than about 3 centimeters diameter and disposed in coaxial, close-spaced parallel relationship, said first plate having a large number N of generally sector-shaped, spaced electrically connected segments, said second plate member having a like number N of generally sector-shaped electrically connected segments, drive means for periodically impressing an electric field across said plate members, said drive means comprising means for supplying to said plate members a periodic signal of frequency $f$ cycles per second, said motor thereby rotating at a speed $f/N$ revolutions per second, and wherein the segments of one plate member are electrically connected in sets, said sets being driven with phased signals, said motor thereby rotating in one direction only.

10. An electrostatic motor comprising:

first and second generally circular, relatively rotatable, planar, multisegmented capacitor plate members each of less than about 3 centimeters diameter and disposed in coaxial, close-spaced parallel relationship, said first plate having a large number N of generally sector-shaped, spaced electrically connected segments said second plate member having a like number N of generally sector-shaped electrically connected segments, drive means for periodically impressing an electric field across said plate members, said drive means comprising means for supplying to said plate members a periodic signal of frequency $f$ cycles per second, said motor thereby rotating at a speed $f/N$ revolutions per second, and wherein N is on the order of 1,000 and wherein said frequency has a number $f$ of cycles per second equal to the N of segments, said motor thereby rotating at a speed of 1 revolution per second.

11. An electrostatic motor comprising:

a pair of relatively rotatable, planar, multisegmented capacitor plate members disposed in close-spaced parallel relationship, and drive means for periodically impressing an electric field across said plates, said drive means providing a unipolar, periodic driving voltage to said plate members, and comprising;

a transformer having an output winding connected across said plate members, first and second transistors, said second transistor being connected across said plate members, means for applying a voltage via said first transistor across the input winding of said transformer, and means for alternately turning on said first and second transistors.

12. An electrostatic motor as defined in claim 1 further comprising means for starting rotation of said motor.

13. A clock comprising:

an electrostatic motor as defined in claim 1, and gear means driven by said motor for operating the hands of said clock.

14. An electrostatic motor comprising:

first and second generally circular, relatively rotatable, planar multisegmented capacitor plate members disposed in coaxial, close-spaced parallel relationship, said first plate member having a large plurality of generally sector-shaped spaced electrically disconnected passive segments, said second plate member having a plurality of generally sector-shaped, spaced segments, alternative ones of which are electrically connected to form two sets of active segments, and means for providing a unipolar periodic voltage a cross said two sets of active segments.

15. An electrostatic motor as defined in claim 14 wherein said segments are formed microlithographically, each of said plates having a diameter of less than about 3 centimeters and having at least 500 elements thereon.

16. A wristwatch comprising:

an electrostatic motor as defined in claim 14, and gear means driven by said motor for operating the hands of said watch.

17. A self-switching electrostatic motor comprising:

a pair of relatively rotatable, planar multisegmented capacitor plate members disposed in close-spaced parallel relationship, the segments on one plate member all being connected to a first terminal, the majority of segments on the other plate member being connected to a second terminal, and the remainder of segments on said other plate member being connected to a third terminal, and circuit means for switching on or off a voltage across said first and second terminals when the capacitance value between said first and third terminals exceeds a threshold level.

18. An electrostatic motor as defined in claim 17 wherein said circuit means comprises a pair of complimentary field effect transistors, series connected across a source of voltage, the gates of said transistors being connected to said third terminal, said first and second terminals being connected across one of said transistors, and a pair of diodes connected in series across said source of voltage, the junction of said diodes also being connnected to said third terminal.

19. An electrostatic motor comprising:

first and second generally circular, relatively rotatable, planar multisegmented capacitor plate members each of less than about 3 centimeters in diameter and disposed in coaxial, close-spaced parallel relationship, said first plate having a large number of generally sector-shaped, spaced electrically connected segments, said second plate member having a large number of generally sector-shaped, spaced conductive segments electrically connected in sets, and drive means for periodically impressing an electric field across said plate members, said sets being driven with phased signals, said motor thereby rotating in one direction only.

* * * * *